Feb. 28, 1928.

H. A. DOWNS 1,660,867

FIRE SAFETY MEANS

Filed Jan. 9, 1926

Inventor

Helen A. Downs.

By Lyon+Lyon

Attorneys

Patented Feb. 28, 1928.

1,660,867

UNITED STATES PATENT OFFICE.

HELEN A. DOWNS, OF LONG BEACH, CALIFORNIA.

FIRE SAFETY MEANS.

Application filed January 9, 1926. Serial No. 80,213.

This invention relates to fire safety, and while it may be applied to any auditorium, it is especially useful when applied in theatres.

When a fire occurs in a crowded theatre it is usual for the persons in the audience to rush for the nearest or most conspicuous exit. Such an exit may become crowded beyond its capacity, resulting in injury or loss of life. In such a case there may be other exits which could have been used to advantage to effect the evacuation in the most expeditious manner.

The general object of the invention is to provide simple means for indicating to any person sitting in the auditorium, before the beginning of the performance, the course he should take in proceeding from his seat to the proper fire-exit, the general purpose being to enable the auditorium to be quickly evacuated and to prevent confusion and loss of life or injury to persons in the audience, in case of fire; in other words, I provide means for directing the audience in such a way as will effect the emptying of the auditorium with the least delay.

Further objects of the invention will appear hereinafter.

The invention consists in the features to be described hereinafter, all of which contribute to produce an efficient fire safety means.

A preferred embodiment of the invention is described in the following specification, while the broad scope of the invention is pointed out in the appended claims.

In practicing the invention I provide means for displaying a series of charts on the screen before the spectators, the first chart of the series representing the floor plan of the theatre with the fire-exits and rows of seats indicated thereon; this representation is provided with division lines dividing the seats into sections corresponding respectively to the different fire-exits; and following the first chart I display on the screen charts which represent one of the sections of seats and showing a marked point in that section in progressive positions which indicate the course to be taken by a person seated in that section in moving to the proper exit.

When the first chart is displayed on the screen every person seated on the floor of the theatre can readily observe the section of the seats in which he is seated. I provide a series corresponding to each section of seats so that every person on the floor of the theatre will observe the course which he is to take in passing to the proper exit.

Figure 5:
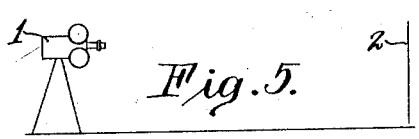
Fig. 5 is a diagrammatic view indicating simple means which may be employed in practicing the invention.

In order to accomplish this, I provide any suitable means for displaying the desired charts on the screen. This means may be in the form of an ordinary projecting camera with a transparent plate corresponding to each picture. However, I prefer to employ an ordinary projecting machine such as indicated diagrammatically at 1 in Fig. 5, which operates to throw the charts on a screen 2 located in front of the spectators in the theatre. This projecting machine may operate with a film carrying photographs of the charts.

Figure 1:
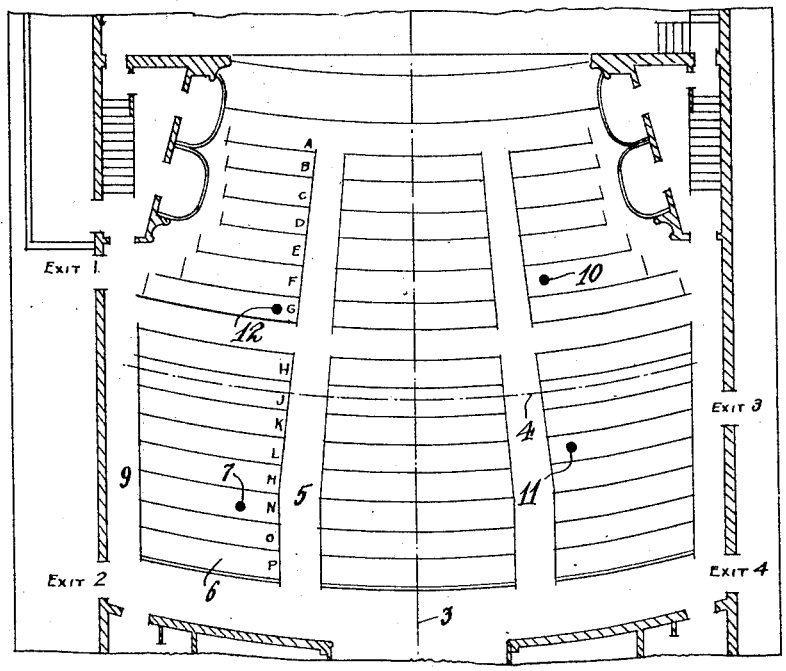
Figure 1 is a view broken away and representing the floor plan of the theatre.

Fig. 1 represents a portion of such a film upon an enlarged scale and indicates the first chart which is thrown upon the screen 2; this chart is a floor-plan of the theatre and shows the seats in lettered rows as indicated by the letters A, B, C, etc. This chart also indicates the position of the fire-exits of the theatre in their true relation to the seats; for example, in the present instance, I have indicated four numbered fire-exits.

In addition to this, I provide division lines such as the center line 3 and transverse division line 4 which divide the seats into sections corresponding to the different exits; for example, at the left side of the chart between the aisle 5 and the left side of the theatre, and back of the division line 4, a section 6 of seats is indicated. A person seated in the forward part of this section 6 would naturally, in case of fire, proceed to the exit 1 which is directly in front of him and on the left. However, such a course might require a greater number of people to pass through exit 1, for example, than exit 2, at the left of the theatre. My invention provides for this contingency and indicates to every person in the section the exit to which he should proceed in order to prevent overcrowding of certain exits, and indicates a movement of the audience which will effect the most efficient evacuation of the theatre in the shortest possible time; and in doing this it may be that certain persons may be directed not to the nearest exit, but to that exit which corresponds to his seat section.

Figure 2:
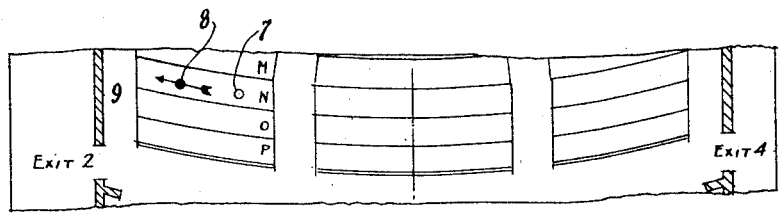
Fig. 2 is a view broken away and showing a portion of the floor plan indicated in Fig. 1; this view indicates particularly the relation of a certain section of the seats in the theatre to the exits, and it also indicates the direction which a person in a certain seat section should proceed in leaving the theatre.

After throwing on the screen a representation of the floor plan, I then follow this chart with a series of charts showing in succession a certain section, for example, the section 6 referred to above. Figure 2 indicates the next chart of the series corresponding to the section 6, and this chart indicates the direction to be taken by a person supposed to be seated at the indicated point 7, in proceeding to leave the theatre. For this purpose I provide a marked point 8 on the chart, which is preferably associated with an arrow indicating the direction to be taken by the person in leaving the row of seats in which he is seated.

Figure 3:
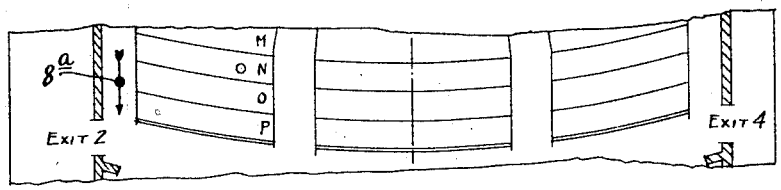
Fig. 3 is a view similar to Fig. 2, also indicating the course this person should take and showing the same at a further stage in his progress to the fire-exit.

The chart shown in Figure 3 indicates the further progress of the marked point 8 and indicates the same at the point 8ª which is in the left aisle 9 of the theatre. In the next chart this marked point is indicated at the point 8ᵇ where the arrow is indicated as passing out through exit 2.

Figure 4:
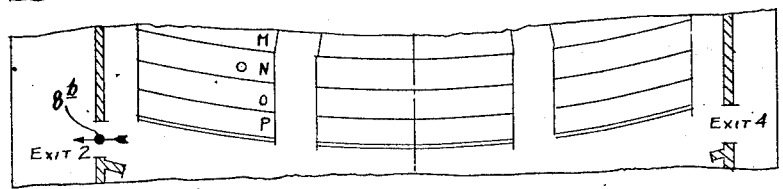
Fig. 4 is a view similar to Fig. 3 and indicating the last step in the progress of a person to the proper fire-exit.

Although I have indicated only one position for the arrow in Figures 2, 3 and 4, respectively, it should be understood that if desired several charts could be used corresponding to Figure 2 and representing different stages in the progress of a person passing toward the aisle 9; likewise, several pictures could be substituted for the chart shown in Figure 3, indicating the progress of the marked point along the aisle 9 toward the exit.

My invention is particularly applicable in theatres where the fire-exits, from necessity, cannot be arranged symmetrically; for example, as indicated at the right in Figure 1, it may be that it is not possible to provide a fire-exit at the right of the theatre opposite exit 1. A person seated at the point 10 in the theatre in looking toward the right side of the theatre and seeing no exits would not known how to proceed. By observing the charts thrown on the screen it could be indicated to him that he should go out through a certain exit, for example, exit 3.

A person seated at the point 11 (see Fig. 1) might be directed to use the exit 4, and not the exit 3 which is nearest to him, always with the object of effecting the evacuation of the whole theatre most expeditiously, though in the case of a person at the point 12 the nearest exit (exit 1) would be indicated for use. There would, of course, be a series of charts corresponding to each seat section as divided by the division lines and each series would indicate the course to be pursued by a person in that particular section in proceeding to leave the theatre.

What I claim is:—

1. A series of charts for the purpose set forth, consisting of a first chart representing the floor plan of the theatre with the fire-exits and lettered rows of seats indicated thereon with division lines dividing the seats into sections corresponding respectively to the different fire-exits, said series having charts following the first chart, representing one of said sections of seats and showing a marked point in the last named section in progressive positions indicating the course to be taken by a person seated in that section in moving to the proper exit.

2. A series of charts for the purpose set forth, consisting of a first chart representing the floor plan of the theatre with the fire-exits and sections of seats indicated thereon, said series having charts following the first chart representing one of said sections of seats and having a marked point in the last named section disposed in progressive positions indicating the course to be taken by a person seated in that section in moving to the proper exit.

Signed at Los Angeles, California, this 31st day of December, 1925.

HELEN A. DOWNS.